United States Patent Office 3,041,327
Patented June 26, 1962

---

3,041,327
METALLIFEROUS AZO-DYESTUFFS
Arthur Buehler, Rheinfelden, Alfred Fasciati, Bottmingen, and Christian Zickendraht, Binningen, Switzerland, assignors to Ciba Limited, Basel, Switzerland
No Drawing. Filed Apr. 27, 1959, Ser. No. 808,954
Claims priority, application Switzerland Apr. 30, 1958
10 Claims. (Cl. 260—145)

This invention provides valuable new metalliferous azo-dyestuffs which contain one atom of chromium bound in complex union to two molecules of different monoazo-dyestuffs of which one contains at least two strongly acid groups imparting solubility in water and the other is free from such groups.

The invention also provides a process for the manufacture of the aforesaid metalliferous azo-dyestuffs, wherein a metallizable metal-free monoazo-dyestuff which is free from sulfonic acid groups and from carboxyl groups not in ortho-position to the azo linkage and a complex chromium compound which contains one atom of chromium bound in complex union to one molecule of a monoazo-dyestuff containing at least two strongly acid groups imparting solubility in water are reacted together in the molecular ratio of about 1:1.

As starting materials for the process of this invention there are advantageously used ortho:ortho'-dihydroxy-monoazo-dyestuffs or complex chromium compounds (1:1-complexes) thereof containing one atom of chromium bound in complex union with one molecule of dyestuff. Alternatively, there may be used ortho-carboxy-ortho'-hydroxy-monoazo-dyestuffs or ortho-hydroxy-ortho'-amino-monoazo-dyestuffs or 1:1-complexes thereof.

The metal free monoazo-dyestuffs and the monoazo-dyestuffs used in the form of 1:1-metal complexes can be obtained by a method in itself known by coupling ortho-carboxy- or ortho-hydroxy-diazo-compounds, especially those of the benzene or naphthalene series, with coupling components capable of coupling in ortho-position to a hydroxyl or amino group. It will be evident from the foregoing remarks that the 1:1-complex chromium compounds must contain at least two acid groups imparting solubility in water, including free carboxylic acid groups (—COO— cation) and especially free sulfonic acid groups (—SO$_3$— cation), any carboxylic acid group taking part in the formation of a complex not being regarded as a group imparting solubility in water, as being bound in this manner they do not impart solubility in water.

The azo-dyestuffs required to form the metal complexes can in other respects be obtained by methods in themselves known or known diazo components and coupling components. Numerous azo-dyestuffs of this kind have been known for a long time as chrome dyestuffs. There may be used for making such azo-dyestuffs, for example, as diazo-components orthohydroxy-amines or ortho-carboxy-amines of the benzene or naphthalene series, and as coupling components hydroxybenzenes, hydroxynaphthalenes, 2:4-dihydroxyquinolines, pyrazolones or acetoacetylaminobenzenes capable of coupling in a position vicinal to a hydroxyl group (or an enolizable keto group), the starting materials being so chosen that the finished dyestuff contains at least two strongly acid groups imparting solubility in water, especially a carboxylic acid group and a sulfonic acid group but preferably two or three sulfonic acid groups. 1:1-complexes of ortho:ortho'-dihydroxy-azo-dyestuffs can be made not only from ortho:ortho'-dihydroxy-azo-dyestuffs but also from the corresponding ortho-hydroxy-ortho'-alkoxy-azo-dyestuffs. For making such 1:1-complexes that are to be converted into 1:2-complexes there may therefore be used, instead of ortho-hydroxy-diazo-compounds the corresponding ortho-alkoxy-diazo-compounds, especially the methoxy-compounds.

As examples of diazo compounds suitable for the manufacture of the chromiferous monoazo dyestuffs may be mentioned those of the following amines:

2-amino-benzene-1-carboxylic acid-4- or -5-sulfonic acid,
2-amino-1-hydroxybenzene-4- or -5-sulfonic acid,
4-chloro-, 4-alkoxy- or 4-methyl-2-amino-1-hydroxybenzene-5- or -6-sulfonic acid,
2-amino-1-hydroxybenzene-4:6-disulfonic acid,
4-nitro-2-amino-1-hydroxybenzene-6-sulfonic acid,
6-nitro-2-amino-1-hydroxybenzene-4-sulfonic acid and, above all, naphthalene compounds such as
2-amino-1-hydroxynaphthalene-4- or -8-sulfonic acid,
6-bromo- or 6-methyl-1-amino-2-hydroxynaphthalene-4-sulfonic acid, and more especially
1-amino-2-hydroxynaphthalene-4-sulfonic acid or
6-nitro-1-amino-2-hydroxynaphthalene-4-sulfonic acid.

Suitable coupling components are, for example:

1-phenyl-3-methyl-5-pyrazolone-2'- -3'- or -4'-sulfonic acid,
2'-chloro-1-phenyl-3-methyl-5-pyrazolone-4'- or -5'-sulfonic acid,
2':5'-dichloro-1-phenyl-3-methyl-5-pyrazolone-4'-sulfonic acid,
1-[naphthyl-(1')]-3-methyl-5-pyrazolone-4'-, -5'-, -6'-, -7'-, or -8'-sulfonic acid,
1-[naphthyl-(2')]-3-methyl-5-pyrazolone-2'- or 8'-sulfonic acid,
1-acetoacetylaminobenzene-4-sulfonic acid and, above all
2-amino- or 2-hydroxynaphthalene-4-, -5-, -6- or -7-sulfonic acid,
2-amino-5-hydroxynaphthalene-7-sulfonic acid,
1-hydroxynaphthalene-4-, -5- or -8-sulfonic acid,
2-phenylaminonaphthalene-3'- or -4'-sulfonic acid and the following polysulfonic acids:
1-[naphthyl-(2')]-3-methyl-5-pyrazolone-4':8'- or -6':8'-disulfonic acid,
1-hydroxynaphthalene-3:6-disulfonic acid,
1-hydroxynaphthalene-3:6:8-trisulfonic acid,
2-hydroxynaphthalene-3:6- or -6:8-disulfonic acid which may likewise be coupled with diazo compounds free from sulfonic acid groups, for example with those of the following amines:
2-aminobenzoic acid,
5-chloro-2-aminobenzoic acid,
2-amino-1-hydroxybenzene-4- or -5-sulfonamides and -sulfones,
4- or 5-chloro-2-amino-1-hydroxybenzene,
4-, 5- or 6-nitro-2-amino-1-hydroxybenzene,
4:6-dichloro-2-amino-1-hydroxybenzene,
3:4:6-trichloro-2-amino-1-hydroxybenzene,
4-chloro-5- or -6-nitro-2-amino-1-hydroxybenzene,
4-nitro-6-chloro-2-amino-1-hydroxybenzene,
6-nitro-4-methyl-2-amino-1-hydroxybenzene,
4-nitro-6-acetylamino-2-amino-1-hydroxybenzene,
6-nitro-4-acetylamino-2-amino-1-hydroxybenzene,
4:6-dinitro-2-amino-1-hydroxybenzene, To manufacture the metal-free monoazo dyestuffs to be used as parent dyestuffs in the present process, the last mentioned amines free from sulfonic acid groups, or the corresponding ortho-alkoxyamines, can be coupled, for example, with the following coupling components (coupling components free from sulfonic acid groups):

Hydroxybenzenes such as para-cresol or para-tertiary amylphenol, 4-methyl-2-acetylamino-1-hydroxybenzene,
4-acetylamino-1-hydroxybenzene,
3,4-dimethyl-1-hydroxybenzene
Pyrazolones, such as 1-phenyl-3-methyl-5-pyrazolone,
1:3-diphenyl-5-pyrazolone, 1-(2'-, 3'- or 4'-chlorophenyl)-3-methyl-5-pyrazolone,
1-(2':5'-dichlorophenyl)-3-methyl-5-pyrazolone,
1-(2'-ethylphenyl)-3-methyl-5-pyrazolone,
1-[naphthyl-(1')- or -(2')]-3-methyl-5-pyrazolone,
1-phenyl-5-pyrazolone-3-carboxylic acid phenylamide,
1-n-octyl-3-methyl-5-pyrazolone,
Hydroxyquinolines, barbituric acid, naphthylamines such as
6-bromo-, 6-methoxy- or 6-methyl-2-aminonaphthalene,
2-phenylaminonaphthalene,
2-aminonaphthalene itself and 2-aminonaphthalene-1-sulfonic acid (which, as is known, yields the same dyestuffs as 2-aminonaphthalene with simultaneous splitting off of the —$SO_3H$— group in the 1-position), and above all, naphthols, such as
6-bromo- or 6-methoxy-2-hydroxynaphthalene and more especially
1-acetylamino-7-hydroxynaphthalene,
1-n-butyrylamino-7-hydroxynaphthalene,
1-benzoylamino-7-hydroxynaphthalene,
1-methanesulfonylamino-7-hydroxynaphthalene,
1-dimethylaminosulfonylamino-7-hydroxynaphthalene,
1-carbethoxyamino-7-hydroxynaphthalene,
8-chloro-1-hydroxynaphthalene,
5-chloro-1-hydroxynaphthalene,
5:8-dichloro-1-hydroxynaphthalene,
4:8- or 5:8-dichloro-2-hydroxynaphthalene,
2-hydroxynaphthalene and, if desired, 1-hydroxynaphthalene.

As has been mentioned hereinbefore, the metalliferous parent dyestuffs used in the process can, as a rule, be manufactured, instead of from the ortho-hydroxydiazo compounds, from the corresponding ortho-alkoxydiazo compounds, particularly from the methoxy compounds. Since certain coupling components—such, for example, as 2-hydroxynaphthalene-8-sulfonic acid or 2-aminonaphthalene-8-sulfonic acid—can at best be coupled with ortho-hydroxydiazo compounds only with difficulty, there is a possibility of using 1:1-complexes of dyestuffs that contain radicals of such coupling components.

The 1:1-complexes used as parent dyestuffs in the present process can otherwise be prepared by any known method, for example by reacting a monoazo dyestuff that is free from complex-forming metal, advantageously one that contains sulfonic acid groups, in an acid medium with an excess of a salt of trivalent chromium, such as chromium formate, chromium sulfate or chromium fluoride, at the boil or, if desired, at a temperature above 100° C.

The reaction of the 1:1-chromium complex with the metal-free dyestuff is advantageously carried out in an aqueous, neutral to weakly alkaline medium, under atmospheric or superatmospheric pressure, at the ordinary or a higher temperature, for example, at a temperature ranging from 50 to 120° C. In general, it is desirable to react the metalliferous 1:1-complex and the metal-free dyestuff together in as nearly equivalent proportions as possible, the molecular ratio of the metal-free dyestuff to the 1:1-complex being advantageously in a ratio of at least 0.85:1 to at most of 1:0.85. An excess of the metalliferous dyestuff is usually less harmful than an excess of the metal-free dyestuff. In general, the closer this ratio approaches 1:1, the better is the result obtained.

The dyestuffs of the invention can also be made by a modification of the above process in which a 1:1-chromium complex of a monoazo-dyestuff free from sulfonic acid groups is reacted with a metallizable monoazo-dyestuff containing at least two sulfonic acid groups. The 1:1-complexes of dyestuffs that are free from sulfonic acid groups can be prepared by metallization in an organic solvent, for example, in glycol. In another modification of the process there is used as starting material a corresponding mixture of two different metallizable monoazo-dyestuffs of which one contains at least two strongly acid groups imparting solubility in water and the other is free from such groups, and the mixture is treated with an agent yielding chromium in a manner such that metalliferous azo-dyestuffs are formed in which one atomic proportion of metal is bound in complex union to one molecular proportion each of the two different monoazo-dyestuffs.

In carrying out this modified process it is in general of advantage to use a mixture of 1 molecular proportion each of two different dyestuffs with a quantity of an agent yielding chromium corresponding to one gram atom of chromium and/or to carry out the metallization in a weakly acid to alkaline medium. It is therefore especially advantageous to use those agents yielding chromium that are stable in an alkaline medium, for example, a chromium compound of an aromatic ortho-hydroxy-carboxylic acid, which compound contains the metal bound in complex union.

The products obtained by the process and its modifications are metal compounds in which one atomatic proportion of chromium is bound in complex union to two molecular proportions of two different monoazo-dyestuffs of which one contains at least two strongly acid groups imparting solubility in water and the other is free from such groups.

If the product of this constitution so obtained by the process still contains a measurable amount of the 1:1-complex used as starting dyestuff, for example, about 0.1 mol of the 1:1-complex per mol of the 1:2-complex obtained as the final product, it is generally of advantage subsequently to convert this excess of 1:1-complex into a suitable 1:2-complex. This can be done with advantage by adding to the reaction mixture, after the reaction, a metallizable monoazo-dyestuff, which is free from sulfonic acid groups and from carboxyl groups not in the ortho-position relatively to the azo linkage, in a quantity that is at least equimolecular relatively to the aforesaid excess of starting dyestuff, and then converting the excess of the 1:1-complex with this metal-free dyestuff into the 1:2-complex in the manner described above.

In an analogous manner products obtained by the process described above, which contain an excess of the metal-free dyestuff, can be after-treated by adding to the reaction mixture, after the reaction, one of the aforesaid agents suitable for making 1:2 complexes. The metal-free starting dyestuff, which is often insoluble in water, can in many cases be isolated, for example, by filtration prior to precipitation of the mixed complex.

The new chromiferous mixed complexes of the invention are suitable for dyeing or printing a very wide variety of materials, and especially for dyeing materials of animal origin, such as silk, leather and especially wool, and also for dyeing or printing synthetic fibers of superpolyamides or superpolyurethanes. They are especially suitable for dyeing nitrogenous fibers, such as wool, from an acid to neutral bath in the presence of a compound that contains at least one basic nitrogen atom to which is bound at least one radial containing a polyglycol ether chain, the molecule containing at least three

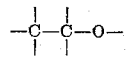

groups (preferably —$CH_2$—$CH_2$—O— groups) and at least four carbon atoms not belonging to such a group, for example, in the presence of a nitrogen compound of the formula

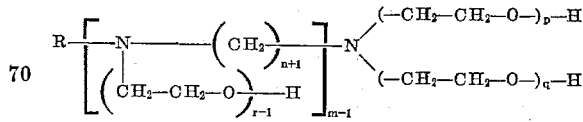

in which R represents a preferably unbranched aliphatic hydrocarbon radical having at least 12, and preferably 16 to 22 carbon atoms, and $m$ and $n$ each represents the whole number 1 or 2, and $p$, $q$ and $r$ each represents a whole number such that the sum $p+q+(m-1)(r-1)$ is at least 3 and at most 20.

The dyeings and prints obtained with the new dyestuffs are generally distinguished by their level character and, especially as compared with similar dyeings obtained by after-chroming, by the purity of their tints, by their good fastness to chlorine and light and above all by their good fastness to rubbing and their properties of wet fastness are often equal to those of dyeings obtained with analogous dyestuffs that are free from sulfonic acid groups and most of which are not so easily accessible.

Unless otherwise indicated, parts and percentages in the following examples are by weight.

EXAMPLE 1

0.01 mol of the chromium complex, containing 1 atomic proportion of chromium bound in complex union to 1 molecular proportion of dyestuff, of the dyestuff from diazotized 1-amino-2-hydroxynaphthalene-4-sulfonic acid and 1-hydroxynaphthalene-8-sulfonic acid is refluxed for 2 hours with 0.01 mol of the dyestuff from diazotized 4-chloro-2-amino-1-hydroxybenzene and 5:8 dichloro-1-hydroxynaphthalene in 200 cc. of water with the addition of 20 cc. of 2 N-sodium carbonate solution. The reaction mixture is then evaporated to dryness in vacuo.

The resulting mixed chromium complex dyes wool by the method described in Example 3 level navy blue tints which are fast to rubbing.

The following table lists a number of further chromiferous dyestuffs (1:2-complexes) obtained by reacting equimolecular proportions of the chromium-free dyestuff in column II and of the 1:1-chromium complex of the appropriate dyestuff shown in column I. The tint obtained with the resulting mixed complex on wool is shown in column III.

| No. | I | II | III |
|---|---|---|---|
| 1 | (structure) | (structure) | Green. |
| 2 | (structure) | (structure) | Blue. |
| 3 | (structure) | (structure) | Green. |
| 4 | (structure) | (structure) | Grey. |
| 5 | (structure) | (structure) | Greyish blue. |

| No. | I | II | III |
|---|---|---|---|
| 6 | (structure) | (structure) | Grey. |
| 7 | (structure) | (structure) | Bluish-grey. |
| 8 | (structure) | (structure) | Violet. |
| 9 | (structure) | (structure) | Red. |
| 10 | (structure) | (structure) | Scarlet. |
| 11 | (structure) | (structure) | Red. |
| 12 | (structure) | (structure) | Brownish red. |
| 13 | (structure) | (structure) | Violet. |

| No. | I | II | III |
|---|---|---|---|
| 14 | [structure: HO₃S-, OH, Cl-phenyl-N=N-C(=N)(CH₃)-C(=N-phenyl-SO₃H)-OH pyrazolone] | [structure: OH, O₂N-phenyl-N=N-naphthol-OH] | Greyish violet. |
| 15 | [structure: HO₃S-, OH, Cl-phenyl-N=N-C-pyrazolone with N-phenyl-SO₃H] | [structure: COOH-phenyl-N=N-C-pyrazolone with N-phenyl-C₂H₅] | Orange. |
| 16 | [structure: HO₃S-, OH, Cl-phenyl-N=N-C-pyrazolone with N-phenyl-SO₃H] | [structure: OH, NO₂-phenyl-N=N-phenyl-OH with C(CH₃)₂C₂H₅] | Violet-brown. |
| 17 | [structure: HO₃S-, OH-phenyl-N=N-hydroxyquinoline-OH] | [structure: O₂N-, OH-phenyl-N=N-C-pyrazolone with N-phenyl, Cl] | Covered red. |
| 18 | [structure: HO₃S-, OH-phenyl-N=N-hydroxyquinoline-OH] | [structure: OH, Cl-phenyl-N=N-C-pyrazolone with N-phenyl] | Brownish red. |
| 19 | [structure: OH-phenyl-SO₃H-N=N-naphthol-SO₃H] | [structure: OH, Cl-phenyl-N=N-C-pyrazolone with N-phenyl] | Do. |
| 20 | [structure: OH, Cl, OCH₃-phenyl-N=N-naphthol-HO₃S, SO₃H] | [structure: OH, Cl-phenyl-N=N-naphthol-OH, Cl, Cl] | Blue. |

EXAMPLE 2

3.09 parts of the dyestuff from diazotized 5-nitroaminophenol and β-naphthol are heated in 200 parts by volume of ethylene glycol and 2.7 parts of crystalline chromium chloride for 4 hours at 122 to 125° C. The blue solution of the 1:1-chromium complex is poured into a solution, heated at 80° C., of 4.73 parts of the dyestuff from diazotized 2-hydroxy-1-amino-naphthalene-4-sulfonic acid and 1-naphthol-8-sulfonic acid in 200 parts by volume of water, 1.6 parts of sodium hydroxide and 2.1 parts of sodium carbonate, and the mixture is stirred at 75 to 85° C. until the parent dyestuffs can no longer be detected. The mixed complex is isolated by pouring the reaction mixture into saturated sodium chloride solution and neutralization with acetic acid, and then filtered off.

EXAMPLE 3

100 parts of knitting wool are immersed at 50 to 80° C. in a dyebath containing in 3000 parts of water 10 parts of crystalline sodium sulfate, 6 parts of acetic acid of 40% strength, 0.5 part of the addition product from oleylamine and ethylene oxide prepared as described below sub A, and 2 parts of the mixed chromium complex described in Example 1. In the course of ½ hour the bath is raised to the boil and the wool is dyed at the boil for 1 hour, then rinsed and dried. A level, navy blue dyeing results.

A. Manufacture of the Addition Product of Ethylene Oxide 100 parts of commercial oleylamine are mixed with 1 part of finely chopped sodium and the whole is heated to 140° C., whereupon ethylene oxide is introduced at 135 to 140° C. When ethylene oxide is being consumed rapidly, the reaction temperature is lowered to 120 to 125° C. and the introduction of ethylene oxide is continued until 113 parts thereof have been absorbed. The resulting reaction product gives an almost clear solution in water.

What we claim is:

1. A metalliferous azo-dyestuff which contains one atom of chromium bound in complex union to two molecules of different o:o'-dihydroxymonoazo-dyestuffs one of which contains two to three sulfonic acid groups and is a member selected from the class consisting of a sulfonaphthalene-azo-naphtholsulfonic acid, a sulfobenzene-azo-pyrazolone-sulfonic acid and a benzene-azo-naphtholpolysulfonic acid; and the other of which is free from carboxylic acid groups, sulfonic acid groups and functional derivatives of the latter, and which is a member selected from the class consisting of dyestuffs of the benzene-azo-naphthalene and the benzene-azo-pyrazolone series.

2. A metalliferous azo-dyestuff which contains one atom of chromium bound in complex union to two molecules of different monoazo-dyestuffs of which one corresponds to the formula

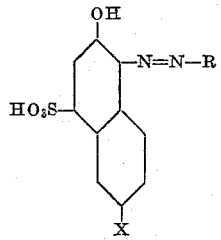

wherein X is a nitro group and R is the radical of a hydroxynaphthalene sulfonic acid bound to the azo linkage in a position vicinal to the hydroxyl group, while the other dyestuff is a benzeneazonaphthalene dyestuff free from carboxylic acid groups, sulfonic acid groups and functional derivatives of the latter.

3. A metalliferous azo-dyestuff which contains one atom of chromium bound in complex union to two molecules of different monoazo-dyestuffs of which one corresponds to the formula

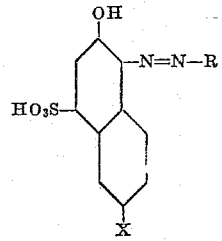

wherein X is a nitro group and R is the radical of a hydroxynaphthalene sulfonic acid bound to the azo linkage in a position vicinal to the hydroxyl group, while the other dyestuff corresponds to the formula

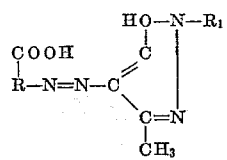

wherein R and $R_1$ represent each a benzene radical free from carboxylic acid groups, sulfonic acid groups and functional derivatives of the latter.

4. A metalliferous azo-dyestuff which contains one atom of chromium bound in complex union to two molecules of different monoazo-dyestuffs of which one corresponds to the formula

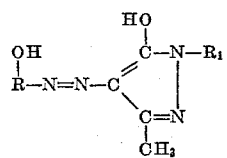

wherein R and $R_1$ represent each a benzene radical free from carboxylic acid groups, sulfonic acid groups and functional derivatives of the latter, while the other monoazo-dyestuff is an o-hydroxybenzeneazo-pyrazolone dyestuff containing a phenyl radical in 1-position of the pyrazolone ring which is bound in 4-position to the azo linkage and a sulfonic acid group in both phenyl radicals of the dyestuff.

5. A metalliferous azo-dyestuff which contains one atom of chromium bound in complex union to two molecules of different monoazo-dyestuffs of which one corresponds to the formula

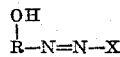

and the other to the formula

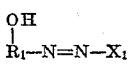

wherein R and $R_1$ each represents a benzene radical free from carboxylic acid groups, sulfonic acid groups and functional derivatives of the latter, and bearing the hydroxyl group in ortho position relatively to the azo linkage, X represents the radical of a 1-hydroxynaphthalene di- to trisulfonic acid bound to the azo linkage in 2-position and $X_1$ represents a naphthol radical free from carboxylic acid groups, sulfonic acid groups and functional derivatives of the latter, and bearing the hydroxyl group in vicinal position relative to the azo linkage.

6. The chromium complex compound which contains one atom of chromium bound in complex union to two molecules of different monoazo-dyestuffs of the formulae

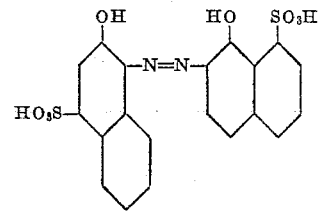

and

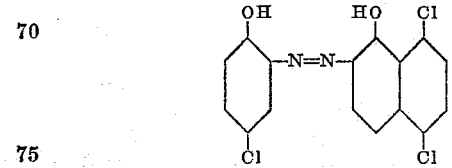

7. The chromium complex compound which contains one atom of chromium bound in complex union to two molecules of different monoazo-dyestuffs of the formulae

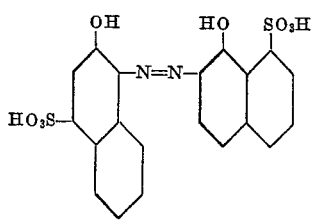

and

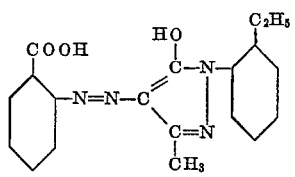

8. The chromium complex compound which contains one atom of chromium bound in complex union to two molecules of different monoazo-dyestuffs of the formulae

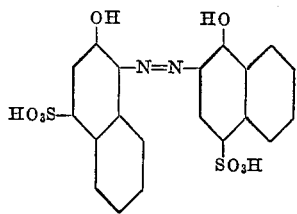

and

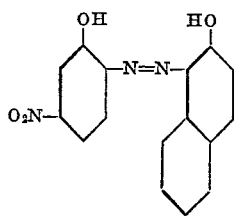

9. The chromium complex compound which contains one atom of chromium bound in complex union to two molecules of different monoazo-dyestuffs of the formulae

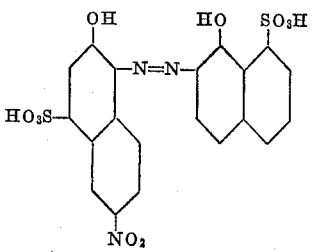

and

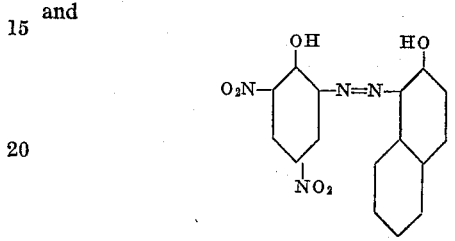

10. The chromium complex compound which contains one atom of chromium bound in complex union to two molecules of different monoazo-dyestuffs of the formulae

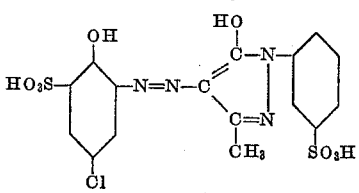

and

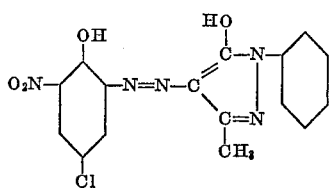

References Cited in the file of this patent
UNITED STATES PATENTS

| | | |
|---|---|---|
| 1,801,745 | Kammerer | Apr. 21, 1931 |
| 2,570,084 | Widmer et al. | Oct. 2, 1951 |
| 2,806,760 | Brassel et al. | Sept. 17, 1957 |

UNITED STATES PATENT OFFICE
CERTIFICATE OF CORRECTION

Patent No. 3,041,327                              June 26, 1962

Arthur Buehler et al.

It is hereby certified that error appears in the above numbered patent requiring correction and that the said Letters Patent should read as corrected below.

Column 4, line 57, for "radial" read -- radical --; column 12, lines 3 to 9, the formula should appear as shown below instead of as in the patent:

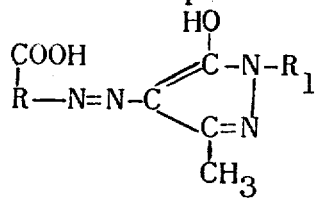

Signed and sealed this 11th day of December 1962.

(SEAL)
Attest:

ERNEST W. SWIDER                                          DAVID L. LADD
Attesting Officer                                             Commissioner of Patents